United States Patent
Rowlands

(10) Patent No.: US 7,752,281 B2
(45) Date of Patent: *Jul. 6, 2010

(54) BRIDGES PERFORMING REMOTE READS AND WRITES AS UNCACHEABLE COHERENT OPERATIONS

(75) Inventor: Joseph B. Rowlands, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 388 days.

This patent is subject to a terminal disclaimer.

(21) Appl. No.: 10/685,136

(22) Filed: Oct. 14, 2003

(65) Prior Publication Data

US 2005/0080948 A1    Apr. 14, 2005

Related U.S. Application Data

(63) Continuation-in-part of application No. 10/269,922, filed on Oct. 11, 2002, now Pat. No. 7,206,879.

(60) Provisional application No. 60/380,740, filed on May 15, 2002, provisional application No. 60/331,789, filed on Nov. 20, 2001, provisional application No. 60/344,713, filed on Dec. 24, 2001, provisional application No. 60/348,777, filed on Jan. 14, 2002, provisional application No. 60/348,717, filed on Jan. 14, 2002.

(51) Int. Cl.
*G06F 12/00* (2006.01)
*G06F 3/00* (2006.01)
*G06F 13/00* (2006.01)
*G06F 15/167* (2006.01)

(52) U.S. Cl. .............. 709/217; 709/213; 709/214; 709/216; 709/218; 709/219; 710/5; 710/36; 711/118; 711/119; 711/120; 711/130; 711/141; 711/147; 711/148; 711/150

(58) Field of Classification Search .......... 710/5, 710/36; 709/213, 214, 216–219; 711/118–120, 711/130, 141, 147, 148, 150

See application file for complete search history.

(56) References Cited

U.S. PATENT DOCUMENTS 4,788,679 A    11/1988 Kataoka et al.

(Continued)

FOREIGN PATENT DOCUMENTS

DE    199 07 200    9/1999

(Continued)

OTHER PUBLICATIONS

Giorgi et al., PSCR: A Coherence Protocol for Eliminating Passive Sharing in Shared-Bus Shared-Memory Multiprocessors; IEEE Transactions on Parallel and Distributed Systems; vol. 10, No. 7, Jul. 1999.

(Continued)

*Primary Examiner*—Tanh Q Nguyen
(74) *Attorney, Agent, or Firm*—Garlick Harrison & Markison

(57) ABSTRACT

A system for managing data in multiple data processing devices using common data paths. Embodiments of the invention comprise a first data processing system comprising a cacheable coherent memory space; and a second data processing system communicatively coupled to the first data processing system with the second data processing system comprising at least one bridge, wherein the bridge is operable to perform an uncacheable remote access to the cacheable coherent memory space of the first data processing system. In some embodiments, the access performed by the bridge comprises a data write to the memory of the first data processing system for incorporation into the cacheable coherent memory space of the first data system. In other embodiments, the access performed by the bridge comprises a data read from the cacheable coherent memory space of the first data system.

8 Claims, 4 Drawing Sheets

U.S. PATENT DOCUMENTS

| | | | | |
|---|---|---|---|---|
| 5,091,850 | A | * | 2/1992 | Culley .................. 711/3 |
| 5,644,753 | A | | 7/1997 | Ebrahim et al. |
| 5,764,895 | A | | 6/1998 | Chung |
| 5,805,590 | A | | 9/1998 | Gillard et al. |
| 5,881,303 | A | * | 3/1999 | Hagersten et al. ........ 712/30 |
| 5,963,745 | A | | 10/1999 | Collins et al. |
| 6,009,426 | A | | 12/1999 | Jouenne et al. |
| 6,094,715 | A | | 7/2000 | Wilkinson et al. |
| 6,108,739 | A | | 8/2000 | James et al. |
| 6,128,728 | A | | 10/2000 | Dowling |
| 6,134,641 | A | * | 10/2000 | Anand .................. 711/202 |
| 6,138,217 | A | | 10/2000 | Hamaguchi |
| 6,167,492 | A | * | 12/2000 | Keller et al. ............ 711/154 |
| 6,185,520 | B1 | | 2/2001 | Brown et al. |
| 6,195,739 | B1 | | 2/2001 | Wright et al. |
| 6,205,508 | B1 | * | 3/2001 | Bailey et al. ............ 710/260 |
| 6,266,731 | B1 | | 7/2001 | Riley et al. |
| 6,298,370 | B1 | | 10/2001 | Tang et al. |
| 6,341,334 | B1 | * | 1/2002 | Kamemaru .............. 711/137 |
| 6,389,526 | B1 | * | 5/2002 | Keller et al. ............. 712/30 |
| 6,463,510 | B1 | * | 10/2002 | Jones et al. ............. 711/138 |
| 6,470,429 | B1 | * | 10/2002 | Jones et al. ............. 711/138 |
| 6,714,994 | B1 | * | 3/2004 | Keller et al. ............. 710/5 |
| 6,738,836 | B1 | * | 5/2004 | Kessler et al. ........... 710/22 |
| 7,003,631 | B2 | * | 2/2006 | Rowlands .............. 711/141 |
| 7,206,879 | B2 | * | 4/2007 | Sano et al. ............. 710/105 |
| 7,266,587 | B2 | * | 9/2007 | Rowlands .............. 709/214 |
| 2003/0105828 | A1 | * | 6/2003 | Sano et al. ............. 709/212 |

FOREIGN PATENT DOCUMENTS

| | | |
|---|---|---|
| EP | 265 636 | 10/1986 |
| EP | 920 157 | 11/1998 |
| EP | 893 766 | 1/1999 |
| EP | 777 179 | 5/2002 |
| WO | 98/15155 | 4/1998 |
| WO | 00/38069 | 6/2000 |

OTHER PUBLICATIONS

European Search Report for EP Application No. 02025691.3 Broadcom Corp., May 9, 2003.

Intel "21143 PCI/CardBus 10/100Mb/s Ethernet LAN Controller," Hardware Reference Manual, Revision 1.0, Oct. 1998, 219 pages.

Tom R. Halfhill, "SiByte Reveals 64-Bit Core for NPUs; Independent MIPS64 Design Combines Low Power, High Performance," Microdesign Resources, Jun. 2000, Microprocessor Report, 4 pages.

SiByte, "The Mercurian Processor," http://sibyte.com/mercurian,, Jan. 15, 2001, 2 pages.

SiByte, "Fact Sheet," SB-1 CPU, Oct. 2000, rev. 0.1, 1 page.

SiByte, "Fact Sheet," SB-1250, Oct. 2000, rev. 0.2, 10 pages.

Stepanian, SiByte, SiByte SB-1 MIPS64 CPU Core, Embedded Processor Forum 2000, Jun. 13, 2000, 15 pages.

Jim Keller, "The Mercurian Processor: A High Performance, Power-Efficient CMP for Networking," Oct. 10, 2000, 22 pages.

SiByte, "Target Applications," http://sibyte.com/mercurian/applications.htm, Jan. 15, 2001, 2 pages.

SiByte, "SiByte Technology," http://sibyte.com/mercurian/technology.htm, Jan. 15, 2001, 3 pages.

* cited by examiner

BRIDGES PERFORMING REMOTE READS AND WRITES AS UNCACHEABLE COHERENT OPERATIONS

RELATED APPLICATIONS

This application claims priority pursuant to 35 U.S.C. §120 as a continuation-in-part (CIP) application of application Ser. No. 10/269,922, filed Oct. 11, 2002, now U.S. Pat. No. 7,206,879, issued Apr. 17, 2007. The Ser. No. 10/269,922 application claims priority pursuant to 35 U.S.C. §119(e) to U.S. Provisional Patent Application Ser. No. 60/380,740, filed May 15, 2002; U.S. Provisional Patent Application Ser. No. 60/331,789, filed Nov. 20, 2001; U.S. Provisional Patent Application Ser. No. 60/344,713, filed Dec. 24, 2001; U.S. Provisional Patent Application Ser. No. 60/348,777, filed Jan. 14, 2002; and U.S. Provisional Patent Application Ser. No. 60/348,717, filed Jan. 14, 2002; in which all of the above-listed provisional applications are incorporated herein by reference in entirety.

Furthermore, this application is related to U.S. patent application Ser. No. 10/270,016, filed Oct. 11, 2002, now U.S. Pat. No. 7,227,870, issued Jun. 5, 2007; and U.S. patent application Ser. No. 10/269,666, filed Oct. 11, 2002, now U.S. Pat. No. 6,912,602, issued Jun. 28, 2005; each of which is incorporated herein by reference in its entirety.

BACKGROUND OF THE INVENTION

1. Field of the Invention

The present invention is directed in general to data communications. In one aspect, the present invention relates to a method and system for improving read and write operations in high-speed data communication systems.

2. Related Art

As is known, communication technologies that link electronic devices are many and varied, servicing communications via both physical media and wirelessly. Some communication technologies interface a pair of devices, other communication technologies interface small groups of devices, and still other communication technologies interface large groups of devices.

Examples of communication technologies that couple small groups of devices include buses within digital computers, e.g., PCI (peripheral component interface) bus, ISA (industry standard architecture) bus, USB (universal serial bus), and SPI (system packet interface). One relatively new communication technology for coupling relatively small groups of devices is the HyperTransport (HT) technology, previously known as the Lightning Data Transport technology (HyperTransport I/O Link Specification "HT Standard"). The HT Standard sets forth definitions for a high-speed, low-latency protocol that can interface with today's buses like AGP, PCI, SPI, 1394, USB 2.0, and 1 Gbit Ethernet as well as next generation buses including AGP 8x, Infiniband, PCI-X, PCI 3.0, and 10 Gbit Ethernet. HT interconnects provide high-speed data links between coupled devices. Most HT enabled devices include at least a pair of HT ports so that HT enabled devices may be daisy-chained. In an HT chain or fabric, each coupled device may communicate with each other coupled device using appropriate addressing and control. Examples of devices that may be HT chained include packet data routers, server computers, data storage devices, and other computer peripheral devices, among others.

Of these devices that may be HT chained together, many require significant processing capability and significant memory capacity. While a device or group of devices having a large amount of memory and significant processing resources may be capable of performing a large number of tasks, significant operational difficulties exist in coordinating the operation of multiprocessors. For example, while each processor may be capable of executing a large number of operations in a given time period, the operation of the processors must be coordinated and memory must be managed to assure coherency of cached copies. In a typical multi-processor installation, each processor typically includes a Level 1 (L1) cache coupled to a group of processors via a processor bus. The processor bus is most likely contained upon a printed circuit board. A Level 2 (L2) cache and a memory controller (that also couples to memory) also typically couples to the processor bus. Thus, each of the processors has access to the shared L2 cache and the memory controller and can snoop the processor bus for its cache coherency purposes. This multi-processor installation (node) is generally accepted and functions well in many environments.

Because network switches and web servers often times require more processing and storage capacity than can be provided by a single small group of processors sharing a processor bus, in some installations, multiple processor/memory groups (nodes) are sometimes contained in a single device. In these instances, the nodes may be rack mounted and may be coupled via a back plane of the rack. Unfortunately, while the sharing of memory by processors within a single node is a fairly straightforward task, the sharing of memory between nodes is a daunting task. Memory accesses between nodes are slow and severely degrade the performance of the installation. Many other shortcomings in the operation of multiple node systems also exist. These shortcomings relate to cache coherency operations, interrupt service operations, etc. For example, when data write operations are implemented in a multi-node system using cacheable store commands, such cache stores require a read of the line before the store can complete. In multi-node systems where latencies for the reads are large, this can greatly reduce the write bandwidth out of a CPU.

Therefore, a need exists for methods and/or apparatuses for improving read and write bandwidth in a multi-node system without sacrificing data coherency. Further limitations and disadvantages of conventional systems will become apparent to one of skill in the art after reviewing the remainder of the present application with reference to the drawings and detailed description which follow.

SUMMARY OF THE INVENTION

In accordance with the present invention, a system and method are provided for improving the bandwidth for data read and write operations in a multi-node system by using uncacheable read and write commands to a home node in the multi-node system so that the home node can determine whether the commands needs to enter the coherent memory space. In a selected embodiment where nodes are connected via HT interfaces, posted commands are used to transmit uncacheable write commands over the HT fabric to a remote home node so that no response is required from the home node. When both cacheable and uncacheable memory operations are mixed in a multi-node system, a producer-consumer software model may be used to require that the data and flag must be co-located in the home node's memory and that the producer write both the data and flag using regular HT I/O commands.

In one embodiment of the invention, a system for managing data in multiple data processing devices using common data paths comprises a first data processing system comprising a memory, wherein the memory comprises a cacheable coherent memory space; and a second data processing system communicatively coupled to the first data processing system with the second data processing system comprising at least one bridge, wherein the bridge is operable to perform an uncacheable remote access to the cacheable coherent memory space of the first data processing system.

In some embodiments of the invention, the access performed by the bridge comprises a data write to the memory of the first data processing system for incorporation into the cacheable coherent memory space of the first data system. In other embodiments of the invention, the access performed by the bridge comprises a data read from the cacheable coherent memory space of the first data system.

In various embodiments of the invention, the data written by the bridge during the uncacheable remote access is processed by the first data system to convert the data to conform to a cacheable coherent memory protocol in the cacheable memory space. The converted data in the cacheable coherent memory space is accessed by an agent subsequent to the conversion. The remote access by said bridge and the subsequent access by the agent conform to a producer-consumer protocol, wherein the bridge corresponds to the producer and the agent corresponds to the consumer of the producer-consumer protocol.

The objects, advantages and other novel features of the present invention will be apparent from the following detailed description when read in conjunction with the appended claims and attached drawings.

DETAILED DESCRIPTION

Figure 1:
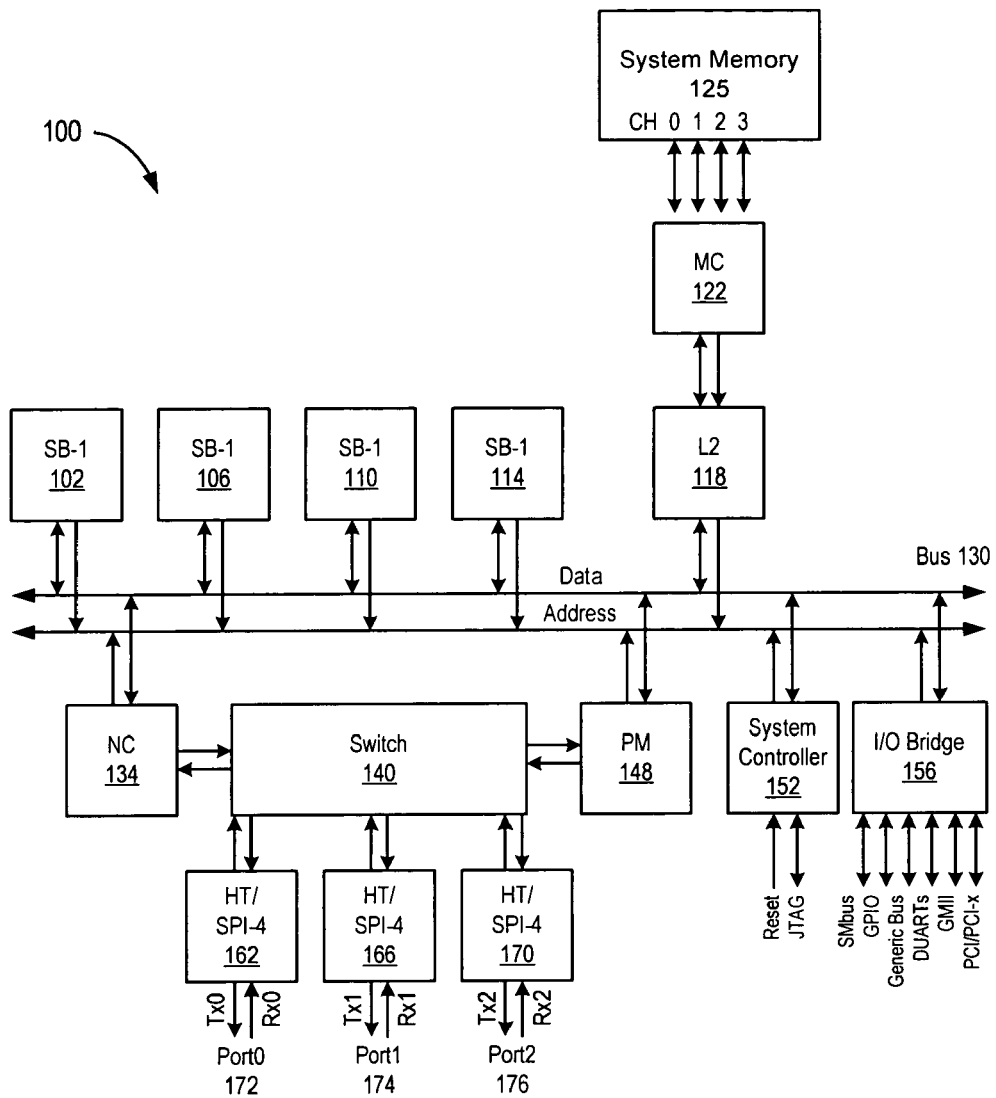
FIG. 1 shows a block diagram of a network multiprocessor switching system-on-a-chip.

An apparatus and method in accordance with the present invention provide a system for reading and writing data in a system of multiprocessor switching chips. A system level description of the operation of an embodiment of the multiprocessor switching system of the present invention is shown in FIG. 1 which depicts a schematic block diagram of a multiprocessor device 100 in accordance with the present invention. The multiprocessor device 100 may be an integrated circuit or it may be constructed from discrete components. The multiprocessor device 100 includes a plurality of processing units 102, 106, 110, 114, cache memory 118, memory controller 122, which interfaces with on and/or off-chip system memory 125, an internal bus 130, a node controller 134, a switching module 140, a packet manager 148, a system controller 152, an I/O Bridge 156 which interfaces the system bus various system interfaces, and a plurality of configurable packet based interfaces 162, 166, 170, such as three flexible HyperTransport/SPI-4 Phase 2 links.

As shown in FIG. 1, the four processors 102, 106, 110, 114 are joined to the internal bus 130. When implemented as standard MIPS64 cores, the processors 102, 106, 110, 114 have floating-point support, and are independent, allowing applications to be migrated from one processor to another if necessary. The processors 102, 106, 110, 114 may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture. The system 100 may include any number of processors (e.g., as few as one processor, two processors, four processors, etc.). In addition, each processing unit 102, 106, 110, 114 may include a memory sub-system (level 1 cache) of an instruction cache and a data cache and may support separately, or in combination, one or more processing functions. With respect to the processing system example of FIG. 2, each processing unit 102, 106, 110, 114 may be a destination within multiprocessor device 100 and/or each processing function executed by the processing modules 102, 106, 110, 114 may be a source within the processor device 100.

The internal bus 130 may be any form of communication medium between the devices coupled to the bus. For example, the bus 130 may include shared buses, crossbar connections, point-to-point connections in a ring, star, or any other topology, meshes, cubes, etc. In selected embodiments, the internal bus 130 may be a split transaction bus (i.e., having separate address and data phases). The data phases of various transactions on the bus may proceed out of order with the address phases. The bus may also support coherency and thus may include a response phase to transmit coherency response information. The bus may employ a distributed arbitration scheme, and may be pipelined. The bus may employ any suitable signaling technique. For example, differential signaling may be used for high speed signal transmission. Other embodiments may employ any other signaling technique (e.g., TTL, CMOS, GTL, HSTL, etc.). Other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice. Furthermore, the bus may not be pipelined, if desired. In addition, the internal bus 130 may be a high-speed (e.g., 128-Gbit/s) 256 bit cache line wide split transaction cache coherent multiprocessor bus that couples the processing units 102, 106, 110, 114, cache memory 118, memory controller 122 (illustrated for architecture purposes as being connected through cache memory 118), node controller 134 and packet manager 148 together. The bus 130 may run in big-endian and little-endian modes, and may implement the standard MESI protocol to ensure coherency between the four CPUs, their level 1 caches, and the shared level 2 cache 118. In addition, the bus 130 may be implemented to support all on-chip peripherals, including the input/output bridge interface 156 for the generic bus, SMbus, UARTs, GPIO, Ethernet MAC and PCI/PCI-X interface.

The cache memory 118 may function as an L2 cache for the processing units 102, 106, 110, 114, node controller 134 and/or packet manager 148. With respect to the processing system example of FIG. 2, the cache memory 118 may be a destination within multiprocessor device 100.

The memory controller 122 provides an interface to system memory, which, when the multiprocessor device 100 is an integrated circuit, may be off-chip and/or on-chip. With respect to the processing system example of FIG. 2, the system memory may be a destination within the multiprocessor device 100 and/or memory locations within the system memory may be individual destinations within the device 100 (as illustrated with channels 0-3). Accordingly, the system memory may include one or more destinations for the multi-node processing systems. The memory controller 122 is configured to access the system memory in response to read and write commands received on the bus 130. The L2 cache 118 may be coupled to the bus 130 for caching various blocks from the system memory for more rapid access by agents coupled to the bus 130. In such embodiments, the memory controller 122 may receive a hit signal from the L2 cache 118, and if a hit is detected in the L2 cache for a given read/write command, the memory controller 122 may not respond to that command. Generally, a read command causes a transfer of data from the system memory (although some read commands may be serviced from a cache such as an L2 cache or a cache in the processors 102, 106, 110, 114) and a write command causes a transfer of data to the system memory (although some write commands may be serviced in a cache, similar to reads). The memory controller 122 may be designed to access any of a variety of types of memory. For example, the memory controller 122 may be designed for synchronous dynamic random access memory (SDRAM), and more particularly double data rate (DDR) SDRAM. Alternatively, the memory controller 122 may be designed for DRAM, DDR synchronous graphics RAM (SGRAM), DDR fast cycle RAM (FCRAM), DDR-II SDRAM, Rambus DRAM (RDRAM), SRAM, or any other suitable memory device or combinations of the above mentioned memory devices.

The node controller 134 functions as a bridge between the internal bus 130 and the configurable packet-based interfaces 162, 166, 170. Accordingly, accesses originated on either side of the node controller will be translated and sent on to the other. The node controller also supports the distributed shared memory model associated with the cache coherency non-uniform memory access (CC-NUMA) protocol.

The packet manager 148 circuitry communicates packets between the interfaces 162, 166, 170 and the system memory, and may be a direct memory access (DMA) engine that writes packets received from the switching module 140 into input queues of the system memory and reads packets from output queues of the system memory to the appropriate configurable packet-based interface 162, 166, 170. The packet manager 148 may include a packet manager input and a packet manager output, each having its own DMA engine and associated cache memory. The cache memory may be arranged as first-in-first-out (FIFO) buffers that respectively support the input queues and output queues.

The packet manager circuit 148 comprises circuitry shared by the interfaces 162, 166, 170. The packet manager may generate write commands to the memory controller 122 to write received packets to the system memory, and may generate read commands to read packets from the system memory for transmission by one of the interfaces 162, 166, 170. In some embodiments, the packet manager 148 may be a more efficient use of hardware than having individual DMA engines for each of the interfaces 162, 166, 170. Additionally, the packet manager may simplify communication on the bus 130, in some embodiments, for packet data transfers. It is noted that, in some embodiments, the system 100 may include an L2 cache coupled to the bus 130. The packet manager 148 may be configured, in some embodiments, to cause a portion of the packet data to be stored into the L2 cache in addition to being stored in memory. In some embodiments, the packet manager 148 may use descriptors to locate the memory locations for reading and writing packet data. The descriptors may be stored in the L2 cache or in main memory. The packet manager 148 may read and write the descriptors as well.

In some embodiments, the interfaces 162, 166, 170 may have dedicated communication paths to the node controller 134 or packet manager 148. However, in the illustrated embodiment, the system 100 employs a switch 140. The switch 140 may selectively couple one of the receive/transmit interfaces 162, 166, 170 to the node controller 134 or packet manager 148 to transfer received data. The switch 140 may selectively couple the packet manager 148 to one of the interfaces 162, 166, 170 to transfer packet data from the packet manager 148 to the interfaces 162, 166, 170 for transmission on the corresponding ports 172, 174, 176. The switch 140 may have request/grant interfaces to each of the interfaces 162, 166, 170 and the packet manager 148 for requesting transfers and granting those transfers. As will be appreciated, a receive/transmit interface includes any circuitry configured to communicate on a port according to the protocol defined for the port. The interface may include receive circuitry configured to receive communications on the port and to transmit the received communications to other circuitry internal to the system that includes the interface. The interface may also include transmit circuitry configured to receive communications from the other circuitry internal to the system and configured to transmit the communications on the port. The switching module 140 functions to direct data traffic, which may be in a generic format, between the node controller 134 and the configurable packet-based interfaces 162, 166, 170 and between the packet manager 148 and the configurable packet-based interfaces. The generic format may include 8 byte data words or 16 byte data words formatted in accordance with a proprietary protocol, in accordance with asynchronous transfer mode (ATM) cells, in accordance with internet protocol (IP) packets, in accordance with transmission control protocol/internet protocol (TCP/IP) packets, and/or in general, in accordance with any packet-switched protocol or circuit-switched protocol. In a selected embodiment, a 256-Gbit/s switch 140 connects the on-chip memory 118 and processors 102, 106, 110, 114 to the three HyperTransport/SPI-4 links 162, 166, 170, and provides transparent forwarding of network, ccNUMA access, and HyperTransport packets when necessary.

The configurable packet-based interfaces 162, 166, 170 generally function to convert data from a high-speed communication protocol (e.g., HT, SPI, etc.) utilized between multiprocessor devices 100 and the generic format of data within the multiprocessor devices 100. Accordingly, the configurable packet-based interface 162, 166, 170 may convert received HT or SPI packets into the generic format packets or data words for processing within the multiprocessor device 100, such as by using a receiver interface (which amplifies and time aligns the data received via the physical link and then converts the received protocol-formatted data into data from a plurality of virtual channels having the generic format), hash and route block and receiver buffer for holding the data until a routing decision is made. Packets arriving through receiver interface(s) of the chip can be decoded in either SPI-4 mode (native packet mode) or in HyperTransport (HT) mode, in which case, it uses a special extension called Packet-over-HT (PoHT) to transfer the packets. From a logical perspective, both modes provide almost identical services. In addition, the configurable packet-based interfaces 162, 166, 170 may convert outbound (transmit) data of a plurality of virtual channels in the generic format received from the switching module 140 into HT packets or SPI packets, such as by using a transmitter formatter and transmitter interface, which take the incoming packet data chunks from the switch and format them according to the mode it is configured in, and then drive the high-speed formatted stream of data onto the physical link coupling the present multiprocessor device 100 to another multiprocessor device. The particular conversion of packets to generic formatted data performed by the configurable packet-based interfaces 162, 166, 170 is based on configuration information, which, for example, indicates configuration for HT to generic format conversion or SPI to generic format conversion.

The system controller 152 is coupled to provide interrupts to the interrupt lines in processors 102, 106, 110, 114 and is further coupled to receive interrupt requests from system modules (such as packet manager 152 or packet-based interfaces 162, 166, 170 illustrated in FIG. 1) and from other devices within the system 100 (not shown). In an alternative embodiment described herein, the interrupt mapping function may instead or in addition be provided in the various system modules that generate interrupts, such as the packet manager 152 or packet-based interfaces 162, 166, 170 illustrated in FIG. 1. The system controller 152 may map each interrupt to one of the interrupt lines of processors 102, 106, 110, 114, and may assert an interrupt signal to the selected processor 102, 106, 110, 114. The processors 102, 106, 110, 114 may access the system controller 152 to determine the source of a given interrupt. The system controller 152 may employ any mapping mechanism. In one embodiment, the system controller 152 may comprise a channel register and a source register to map each interrupt request to each processor 102, 106, 110, 114. The channel register identifies to the processor which channels are generating interrupts, and the source register indicates the real source of a channel's interrupt. By using a programmable interrupt controller in the packet manager with interrupt channel and source information stored in configuration status registers, the interrupt mapper can mask events and vector interrupts to their final destination using at most two CSR read operations by the processor, although additional mapping can be done in the system controller 152.

In one embodiment, the interfaces 162, 166, 170 may support a set of virtual channels (VCs) in which packets are transmitted. A virtual channel corresponds to the notion of "port" in the SPI-4 specification, and may be used to provide virtual independent flow of packets. The VC is "virtual" in that all the datapaths, including at the I/Os, are provided through a single physical channel, for example by time-multiplexing multiple flows through a single physical channel. Each virtual channel is defined to flow independently of the other virtual channels, even though the virtual channels may share certain physical resources (e.g., the port 172, 174, 176 on which the packets are flowing). These virtual channels may be mapped to internal virtual channels (also referred to as output virtual channels). The datapaths of the high-speed ports 162, 166, 170, the switch 140, and the packet manager 148 all support virtual channels. That is, the switch may grant a coupling between a source and a destination based not only on the ability of the source to transfer data and the destination to receive data, but also on the ability of the source to transfer data in a particular output virtual channel and the destination to receive data on that output virtual channel. Thus, requests from sources may indicate the destination and the virtual channel on which data is to be transferred, and requests from destinations may indicate the virtual channel on which data may be received. Additionally, in some embodiments, the switch 140 may merge inputs to a given destination virtual channel on a packet boundary. That is, if two sources are requesting to transfer packet data to the same destination and virtual channel, and one of the sources has been granted to that destination and virtual channel, the switch inhibits granting to the other source for that destination and virtual channel until the current source reaches a packet boundary.

In one embodiment, the system 100 (and more particularly the processors 102, 106, etc., the memory controller 122, the interfaces 162, 166, etc., the node controller 134, the packet manager 148, the switch 140, the system controller 152 and the bus 130) may be integrated onto a single integrated circuit as a system on a chip configuration. Additional circuitry (such as PCI interfaces, serial interfaces, Personal Computer Memory Card International Association (PCMCIA) interfaces, etc.) may also be integrated. Alternatively, other embodiments may implement one or more of the devices as separate integrated circuits. In another configuration, the system memory may be integrated as well. Alternatively, one or more of the components may be implemented as separate integrated circuits, or all components may be separate integrated circuits, as desired. Any level of integration may be used. The system 100 may be designed to take advantage of the integration by tightly coupling the components to provide high performance packet processing. Specifically, the processors 102, 106, etc., the L2 cache 118, the memory controller 122, node controller 134, system bus 130 and the packet interface circuits 162, 166, 170 may be tightly coupled to receive, process, and forward data (if necessary).

As will be understood, the multiprocessor device 100 of the present invention provides multiprocessing functionality on its own which makes it suitable for scientific and embedded applications requiring significant computational capabilities. In a selected embodiment, the multiprocessor device 100 of the present invention contains a number of peripherals along with its sophisticated memory and communication support. For example, in a selected embodiment, the processor cores (e.g., 102) are 0.8 to 1.2-GHz, 64-bit MIPS with 64 kbytes of level one cache memory per processor and 1 Mbyte of level two cache 118 per chip; an 800-MHz DDR controller 122; off-chip ccNUMA support and optional ECC support. Three 8/16-bit receive/transmit ports 162, 166, 170 are also provided that are configurable as either HyperTransport or SPI-4 links. Additional peripheral features include an input/output bridge 156 that includes a 10/100/1000 Ethernet MAC interface, general-purpose I/O ports, SMBus serial interfaces, four DUARTs and a 32-bit 33/66-MHz PCI or 64-bit 133 MHz PCI/x interface.

In addition to providing stand alone computational functions, the multiprocessor devices 100 may also be used in communication-oriented applications that need significant computational support, like an array of HyperTransport linked chips for use with Internet service routers and switches with deep content switching and differentiated services such as quality-of-service (QoS) and virtual private networks (VPNs). The multiprocessor devices 100 may also be used in Internet-Protocol (IP) servers and subscriber-management platforms, servers supporting high computational requirements for scientific or Enterprise Java environments, and wireless infrastructure equipment. With three ports 172, 174, 176 on the chip, up to eight chips can be connected via the HyperTransport links in a "cube" configuration of nodes, for a 32-processor system.

When used in a HyperTransport linked network, the multiprocessor devices 100 provide a highly integrated nonuniform memory access (NUMA) architecture with low power consumption that multiplexes memory and I/O traffic on the same link. In contrast to conventional symmetrical multiprocessing systems (where all processors have the same memory access time and a bus or switch acts as an interface between processors and the memory subsystem so that cache coherence is maintained by monitoring the bus or the switch traffic), with NUMA, the memory address space is made up of the combined local memory (e.g., system memory 125) from each node in the system. A processor can access its local memory faster than nonlocal memory. NUMA systems have the advantage of being easily expanded, while adding a processor to a conventional SMP shared memory architecture is more difficult because an additional port is needed.

By using a cache-coherent form of NUMA (ccNUMA), on-chip caches can remain up to date even while data moves through the processor/memory interconnect. The on-chip double-data-rate (DDR) memory controller 122 supports the chip's local, off-chip memory, and its HyperTransport links 162, 166, 170 provide ccNUMA support.

Figure 2:
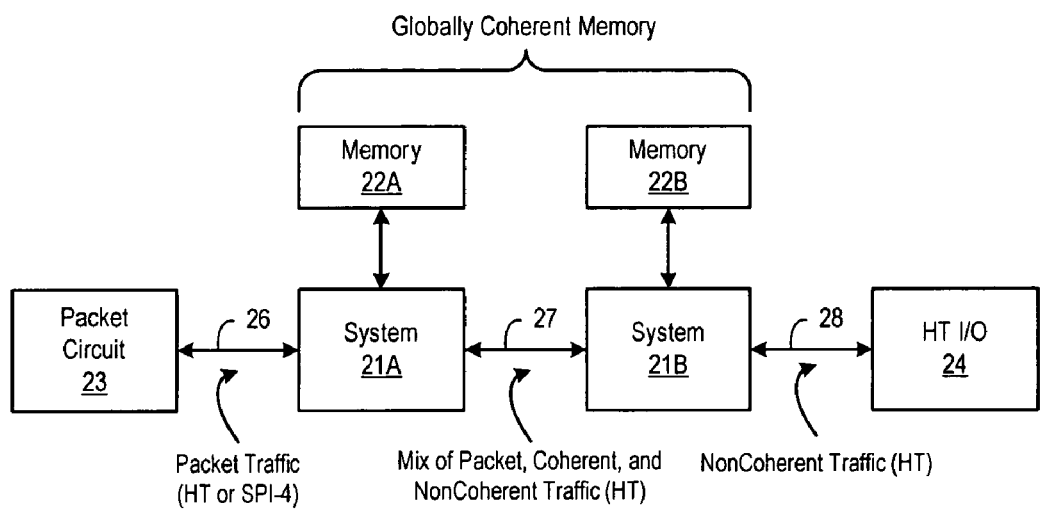
FIG. 2 is a block diagram of one embodiment of a packet processing system including two (or more) of the systems shown in FIG. 1.

Turning now to FIG. 2, a block diagram of one embodiment of a packet processing system 20 is shown. In the embodiment of FIG. 2, the packet processing system 20 includes two instantiations of the system 100 shown in FIG. 1 (systems 21A and 21B in FIG. 2). Each system 21A and 21B is coupled to a respective memory 22A and 22B (memories 118 and/or 125 in FIG. 1) which may form a globally coherent memory using coherency commands between the systems 21A and 21B. The packet processing system 20 further includes a packet circuit 23 and an input/output (I/O) circuit 24. The packet circuit 23 is coupled to the system 21A via an interface 26. The systems 21A and 21B are coupled via an interface 27. The system 21B and the I/O circuit 24 are coupled via an interface 28. Each of the interfaces 26, 27, 28 may be one of the interfaces 172, 174, 176 on the corresponding system 100 shown in FIG. 1.

In the embodiment of FIG. 2, the interface 26 may be a packet interface carrying packet traffic between the packet circuit 23 and the system 21A. Any of the above-mentioned packet interfaces may be used. In one particular embodiment, for example, the interface 26 may be a HT interface (using the PoHT extension) or the SPI-4 interface, as desired. As used herein, a packet circuit includes any circuit which sources and/or receives packets. For example, the packet circuit 23 may be a media access control (MAC) circuit having a SPI-4 or HT packet interface. The packet circuit 23 may further comprise switches, routers, gateways, etc.

In the embodiment of FIG. 2, the interface 28 may be any interface capable of carrying noncoherent traffic. For example, any peripheral interface may be used (e.g. peripheral component interconnect (PCI), universal serial bus (USB), firewire, etc.). In one particular embodiment, the HT interface is used for the interface 28. The interface 28 may carry commands for communicating with various I/O circuits, such as I/O circuit 24. Generally, an I/O circuit may be any device which communicates as a peripheral to the packet processing system 20. For example, an I/O circuit 24 may be a bridge to one or more I/O interfaces (e.g. PCI, USB, etc.), an I/O device, etc.

In the embodiment of FIG. 2, the interface 27 may be any interface capable of carrying a mix of packet, coherent, and noncoherent traffic. In one embodiment, for example, the interface 27 may be an HT interface (using the PoHT extension for packet traffic and the HTcc extension for coherency commands). The use of an interface 27 which carries a mix of packet, coherent, and noncoherent traffic may permit efficiency and scalability in the packet processing system 20, in some embodiments. Since the three types of traffic may be carried on the same interface, each system (e.g., 21A) included in the packet processing system may communicate with another system (e.g., 21B) efficiently (e.g. using one interface). Furthermore, the system may be scalable to more systems. Coherency may be used to permit any system (e.g., 21A) to access any memory location, local or remote. Packet traffic between the systems 21A, 21B may be used to route packets among the systems for processing, balancing the processing load among the systems. Additionally, packet traffic between the systems 21A, 21B may be used to route a packet from one system (e.g., 21B) through one or more other systems (e.g., 21A) to a packet circuit (e.g., 23). That is, any system may transmit a packet to a packet circuit coupled to any other system. Similarly, noncoherent traffic may be used to allow any system to communicate with any I/O circuit.

While two systems 21A and 21B are illustrated in the packet processing system 20 of FIG. 2, other embodiments may include more than two systems 21A, 21B. Each system may be coupled to at least one other system via an interface that is capable of carrying a mix of packet, coherent, and noncoherent traffic. Similarly, other systems may include more packet circuits and/or I/O circuits, as desired.

As explained above, when multi-node systems 20 are linked in a HyperTransport network, each system (e.g., 21A) provides a highly integrated nonuniform memory access (NUMA) architecture which uses a memory address space is made up of the combined local memory (e.g., memory 22A, 22B) from each node in the system. And by using a cache-coherent form of NUMA (ccNUMA), on-chip caches can remain up to date, even while data moves through the processor/memory interconnect.

As will be understood by those skilled in the art, there are two types of memory reads and writes that travel along the HT fabric. The first type of memory traffic is the regular HT I/O commands (I/O), which include the Posted commands, the Non-Posted commands, and the Response commands. The second type of memory traffic is the ccNUMA commands, including the coherent read (CRD), probe (PRB), acknowledgement (ACK), and coherent fill (CFILL) commands.

When an agent (e.g., system 21A) accesses a remote memory (e.g., memory 22B), the kind of request made by the agent determines when/if the commands interacts the coherent domain for the system 20. If a cacheable coherent request is a remote line, the request immediately checks the coherent agents on that node for a cached copy of the line. If the line is present in a usable ownership state (MSI), the owner can immediately provide the data, and as a result, the coherent domain is accessed immediately. But if the request does not hit in the local node, it will propagate a cache coherent command through the HT fabric.

If the request to memory in a remote node (e.g., memory 22B) is either uncacheable or cacheable non-coherent, the local node's (e.g., system 21A) caches will not be accessed. The request will bypass local node's caches, having no coherent side-effect. The request will travel through the HT fabric via I/O commands (e.g., noncoherent HT traffic interface 27), and eventually propagate to the home node (e.g., system 21B). Only when the I/O request arrives at the home node 21B does it interact with the coherent domain. When a read request arrives at the home node, it will make a coherent request on the bus to acquire the latest piece of data. This coherent request may have coherence side-effects, like the issuing of probes to remote lines. Similarly, when a write command arrives at the home node, it enters the coherent domain by doing either a cache coherent read on the bus, modifying the line, and writing it back, or issuing a Write-Invalidate command. In either case, probes may need to be issued to invalidate copies of the line, and the latest data may need to be acquired.

In accordance with the present invention, I/O devices (such as the I/O Bridge 156, system controller 152, node controller 134 and packet manager 148) on the system bus 130 never do cacheable coherent requests to remote addresses. Instead, they are mapped to uncacheable reads and writes, which get translated to HT I/O commands. Although a device could function correctly using coherent commands, the latency and bandwidth for writes is greatly reduced. For example, in order to complete a coherent write operation, the agent would have to issue CRDs to the home node, wait for the CFILL to return, and then they could update the line. They would then, due to lack of cache space in that agent, immediately evict the line again to the home node. By dealing exclusively with uncacheable commands, the writes can be "posted" so that they are completed as soon as it is transferred on the bus and no acknowledgement is required. Latency issues are eliminated and the bandwidth is no longer determined by how many writes can be outstanding at a time. In addition, bandwidth is not impacted by the sending of traffic back and forth.

The ccNUMA protocol works fine if everyone accessing a particular range of addresses is using cache coherent commands. Alternatively, the regular HytperTransport I/O command protocol works fine by ordering operations in the fabric. When users mix the two protocols, the results are not always guaranteed to work well. Only certain software models, such as the producer/consumer model, are expected to function with a combination of protocols.

The producer/consumer model involves one agent writing a block of data, and following it with a write of a flag that marks the data as valid. The agent doing the stores is called the "producer." Another agent, the "consumer," will read the flag and spin on it until it finds that the flag has been marked and the data is valid. The consumer may then read the data and be assured that it is the new data provided by the producer. This model works fine with either all cache coherent traffic, or all HT I/O traffic. When HT I/O and cache coherent traffic are mixed, certain conditions must be met in order to guarantee that the model works. First, the data and flag must be co-located in memory at a single node. In particular, both must reside in the same home node's memory. On top of this restriction, the producer must do both the data and flag writes using HT I/O commands. Since the writes are ordered in the fabric and are going to the same destination node, the first write (the data) is guaranteed to be visible to all agents before the flag is visible. If the stores are done using cache coherent commands, and are completed in the correct order, then their effects will be visible in the correct order, regardless of location in memory. If the consumer is using I/O reads, it needs to complete the first read before issuing the second read.

Another software model that works is to store data to a remote address, but update a flag locally. To implement remote storage with local flag update, the producer first performs the remote storage of the data using HT I/O commands. The consumer can read the flag using I/O commands, though the consumer needs to be located at the home node of the data. In this way, the response for the non-posted Requests (NPC) read will push the write of the data to the consumer's memory, guaranteeing it will be visible to the consumer. If the producer does the store of data using coherent commands, and completes it before starting the store to the flag, the consumer will always be able to see the new data if it sees the new flag. Again, this requires the consumer to complete the read of the flag before initiating the read of the data.

Figure 3:
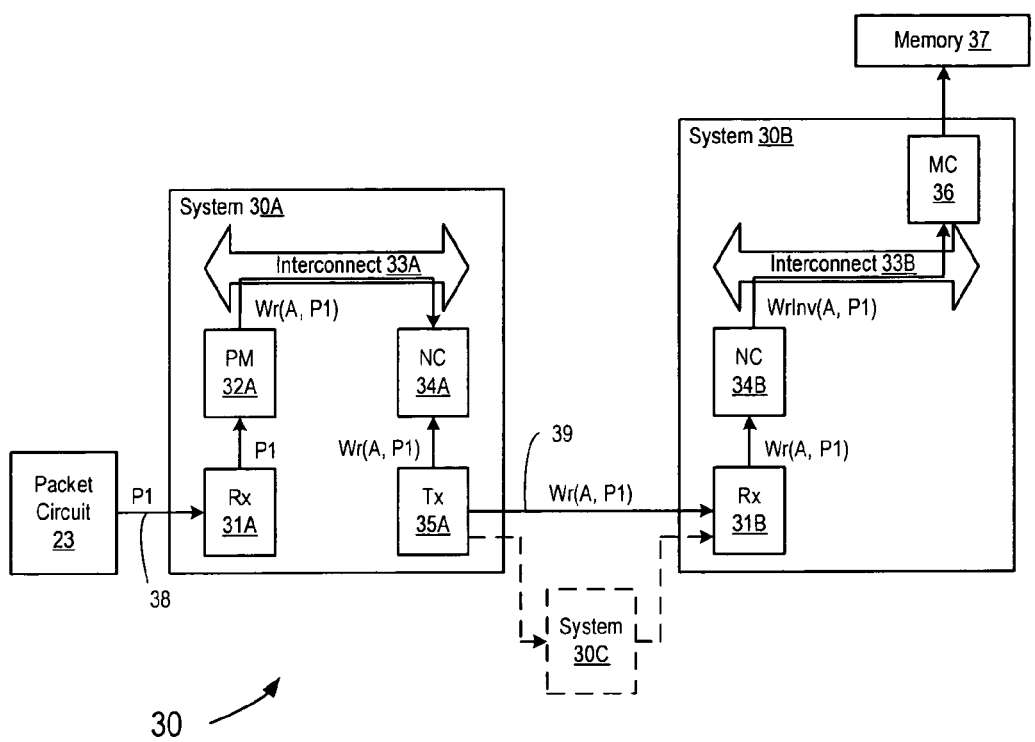
FIG. 3 is a block diagram of a first example of communication in the packet processing system shown in FIG. 2.

FIG. 3 is an example of the packet processing system 30 in which a combination of the coherency, noncoherent, and packet features of the systems 30A, 30B, 30C are used to store or write a packet in a memory coupled to a system 30B which is remote to the system 30A that is coupled to the packet circuit 23 that sources the packet. In this example, an uncacheable write command to the remote node (in system 30B) is transmitted across the HT fabric on interface 39 via posted commands (PC) that push other posted commands. In the example of FIG. 3, a packet P1 is shown. The packet circuit 23 transmits the packet P1 on the interface 38 to the system 30A (specifically, the Rx circuit 31A receives the packet P1). The Rx circuit 31A may use one or more packet attributes of the packet P1 to determine that the packet P1 is to be transmitted to the packet manager circuit 32A.

The packet manager circuit 32A in the system 30A receives the packet P1, and generates one or more write transactions on the interconnect 33A to write the packet P1 to memory. Each write transaction may transfer a cache block of data in this embodiment, and thus the number of write transactions may be dependent on the number of cache blocks in the packet (and the alignment of the packet in memory). The transactions may be noncoherent write transactions (Wr), and thus the coherent agents in the system 30A may take no action with regard to the write transactions. In this example, the packet manager circuit 32A in the system 30A is programmed to write the packet P1 to a memory address "A" which identifies a memory location in the memory 37 coupled to the system 30B. For example, the packet manager circuit 32A may be programmed via a set of descriptor rings, though any mechanism for programming the packet manager circuit 32A with addresses for storing packets may be used.

The node controller 34A in the system 30A detects the write transactions to the address A (a remote address for the system 30A) and generates corresponding noncoherent write commands (e.g. standard HT write commands) to transmit the cache blocks to the system 30B. The node controller 34A transmits the write commands to the Tx circuit 35A in the system 30A (responsive, e.g., to a programmable address map in the node controller 34A which maps the address A to the Tx circuit 35A). The Tx circuit 35A transmits the write commands on the interface 39 to the Rx circuit 31B in the system 30B, which routes the write commands to the node controller 34B in the system 30B. The Rx circuit 31B may detect that the write commands are to be routed to the node controller 34B in the system 30B (as opposed to a Tx circuit for routing to another system) by, e.g., comparing the node number of the system 30B (which may be stored in a configuration register for the system 30B) to the address A.

The node controller 34B in the system 30B generates write transactions (e.g. WrInv) on the interconnect 33B in the system 30B in response to the coherency commands. Since the address A is local to the system 30B, the memory controller 36 in the system 30B may receive the write transactions and write the data transmitted with the write transaction (the packet P1 data) to the memory 37. It is noted that, if other nodes have copies of the cache blocks being written by the write transactions (as indicated by a remote line directory stored in the node controller 34B in the system 30B), the node controller 34B in the system 30B may also generate probes to those nodes to invalidate those copies. That is, the WrInv transaction may be a coherent transaction that invalidates cached copies of the cache block updated by the WrInv transaction. The node controller 34B may generate a WrInv transaction responsive to the write command and further responsive to detecting that the write command is in the home node and updates the entire cache block. Thus, the write commands enter the coherent domain (i.e., they become coherent) in the home node (the system 30B in this example).

The combination of the coherency features, noncoherent features, and packet features of the system 30 are thus used, in the example of FIG. 3, to permit the packet manager circuit 32A in the system 30A to serve as a remote DMA device to DMA packet data to the memory 37. Thus, a packet manager circuit 32A near the packet source may be used to store packets in any system 30A, 30B, 30C, etc. within the packet processing system 30. The operation illustrated in FIG. 3 may permit the packet processing load from the packet circuit 23 to be balanced among the systems 30A, 30B, 30C included in the packet processing system 30, for example. Also, using the features are shown in FIG. 3 may avoid performing reads of the affected data by the system 30A to permit coherent update of the cache blocks in the system 30A. By transmitting the data to the system 30B using noncoherent writes, a more efficient transfer may be performed.

It is noted that, in packet processing system 30 embodiments including more systems, the coherency commands may pass through one or more additional systems (e.g. the system 30C illustrated in dotted form in FIG. 3). The additional systems (such as system 30C) may have packets written to memory coupled to those additional systems as well.

Figure 4:
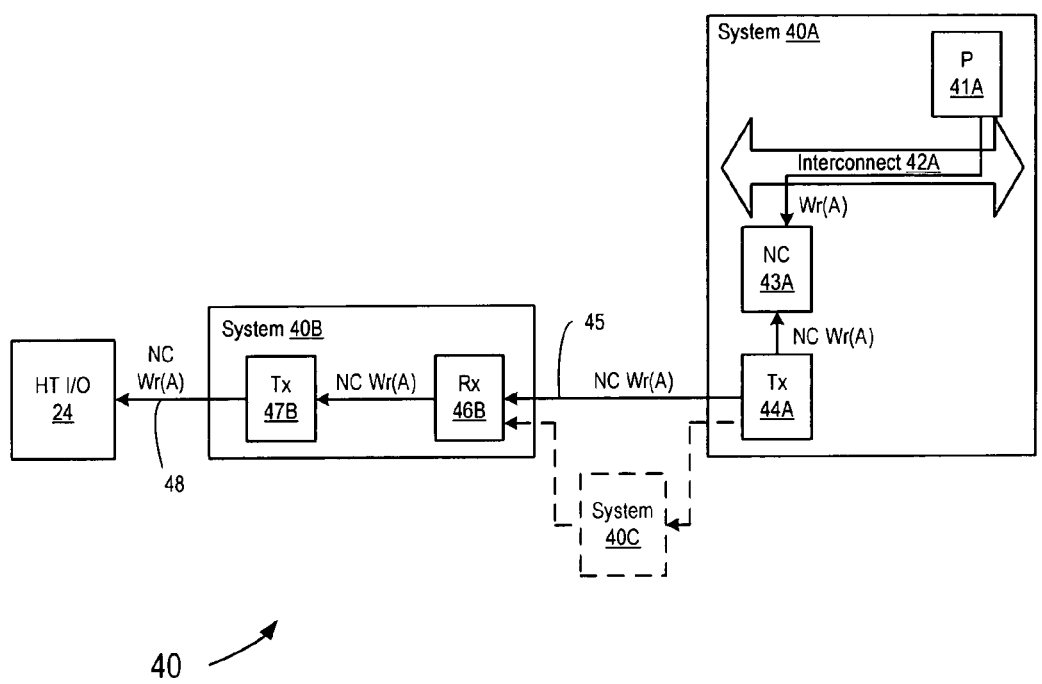
FIG. 4 is a block diagram of a second example of communication in the packet processing system shown in FIG. 2.

FIG. 4 is an example of the packet processing system 40 in which the noncoherent features of the systems 40A, 40B are used to permit a processor 41A in the system 40A to transmit a noncoherent write to an I/O circuit 24. In the example of FIG. 4, the processor 41A transmits a write transaction on the interconnect 42A. The write transaction may be to an address "A" that is mapped to the I/O circuit 24, or may be a transaction type that indicates the transaction is to an I/O circuit. The node controller 43A in the system 40A detects the noncoherent write, and generates a noncoherent command (NC WR(A) in FIG. 4). The node controller 43A determines (e.g. via a programmable address map or other programmable mechanisms) that the noncoherent command is to be transmitted to the Tx circuit 44A.

The Tx circuit 44A transmits the noncoherent command on the interface 45 (e.g. as a standard HT command). The Rx circuit 46B in the system 40B receives the noncoherent write, and determines that the noncoherent write is to be transmitted to the Tx circuit 47B in the system 40B (e.g. according to standard HT routing mechanisms). The Tx circuit 47B transmits the noncoherent command on the interface 48 to the I/O circuit 24.

The operation similar to FIG. 4 may permit any processor in any system within the packet processing system 40 to communicate with any I/O circuit 24 connected to any system 40A, 40B, etc. Read operations may be similar to that shown in FIG. 4, with data being returned along the same path that the read command takes (or a different path, if additional systems 40C are included).\

It is noted that, in packet processing system 40 embodiments including more systems 40A, 40B, the noncoherent command may pass through one or more additional systems (e.g. the system 40C illustrated in dotted form in FIG. 4). The additional systems (such as system 40C) may have noncoherent commands routed to those additional systems as well.

In some embodiments, the systems (e.g., system 100 in FIG. 1) may include other I/O interfaces (e.g. PCI, USB, etc.) that may be reached via one or more I/O interface circuits coupled to the bus 130 of a system 100 or through a bridge (e.g., 156 in FIG. 1) to the bus 130. In such systems, noncoherent reads and writes may be routed from a processor in any system (e.g., 40A) to a system (e.g., 100) coupled to a desired I/O circuit (e.g., 24) via one of the I/O interfaces (e.g., PCI/PCI-x interface), and that system 100 may route the noncoherent command to the node controller 134 in that system 100. The node controller 134 may generate a write transaction on the bus 130 and the I/O interface circuit (or bridge) may receive the write transaction for routing to the desired I/O circuit.

In accordance with the system and method of the present invention disclosed herein, coherency-related delays and bandwidth limitations are avoided by requiring that all remote read and write operations performed by bridges be done as uncacheable commands that are transmitted to the remote node as a posted HT command. Thus, instead of immediately entering the coherent fabric when a read or write command issues, the commands are routed to the home node for the affected memory line, and the decision on whether to enter the coherent fabric is made by the home node. While such a system can cause delays for certain transactions, the overall performance is improved by reducing coherency-induced bandwidth traffic. The home node may implement a remote line directory for keeping track of its local memory lines by maintaining information on whether its lines have been checked out, in which case a probe may be issued to the remote node to fetch or invalidate the line. By using uncacheable read and write commands and letting the home node decide whether to enter the coherent fabric, the read and write commands are effectively provided as the simplest form of command which any device can handle. In other words, the use of uncacheable commands covers all cases.

As will be appreciated, the present invention may be implemented in a computer accessible medium including one or more data structures representative of the circuitry included in the system described herein. Generally speaking, a computer accessible medium may include storage media such as magnetic or optical media, e.g., disk, CD-ROM, or DVD-ROM, volatile or non-volatile memory media such as RAM (e.g., SDRAM, RDRAM, SRAM, etc.), ROM, etc., as well as media accessible via transmission media or signals such as electrical, electromagnetic, or digital signals, conveyed via a communication medium such as a network and/or a wireless link. For example, data structure(s) of the circuitry on the computer accessible medium may be read by a program and used, directly or indirectly, to implement the hardware comprising the circuitry described herein. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlist(s) comprising lists of gates from a synthesis library. The netlist(s) comprise a set of gates which also represent the functionality of the hardware comprising the circuitry. The netlist(s) may then be placed and routed to produce one or more data set(s) describing geometric shapes to be applied to masks. The masks may then be used in various semiconductor fabrication steps to produce a semiconductor circuit or circuits corresponding to the circuitry. Alternatively, the data structure(s) on computer accessible medium may be the netlist(s) (with or without the synthesis library) or the data set(s), as desired. In yet another alternative, the data structures may comprise the output of a schematic program, or netlist(s) or data set(s) derived therefrom. While a computer accessible medium may include a representation of the present invention, other embodiments may include a representation of any portion of the multiprocessor system and/or data transfer circuits (e.g., processors, memory controller, bus, node controller, packet manager circuit (or portions thereof), switch, receive/transmit interface circuits (or portions thereof), etc.).

While the system and method of the present invention has been described in connection with the preferred embodiment, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A system for managing coherent data access through multiple nodes, comprising:

a first data processing system forming a first node, in which the first data processing system includes a first processor, a first bridge, a first interface and a first memory that is local to the first node, wherein the first node supports packet traffic for transfer of packets, coherent traffic to access the first memory and non-coherent traffic to communicate with input/output (I/O) circuitry, in which the first memory stores first cacheable data having global coherency; and a second data processing system forming a second node that also supports packet traffic, coherent traffic and non-coherent traffic, in which the second data processing system includes a second processor, a second bridge, a second interface and a second memory that is local to the second node, the second memory storing second cacheable data also having global coherency, the first and second interfaces coupling the first node to the second node via a bi-directional bus for transfer of packet traffic, coherent traffic and non-coherent traffic between the first and second nodes, wherein when the second node receives a data packet from an external source that is to access a cache coherent fabric of the first memory, the second bridge identifies the first memory as located in the first node and generates to an uncacheable data access request to the first node for the data packet instead of performing a cache coherent memory access operation to access the first memory from the second node, so that the access to the first memory does not access a coherent fabric of the second memory in the second node, and when the first bridge receives the uncacheable data access request, the first bridge identifies the uncacheable data access request as a local access request to the first memory in the first node and processes the uncacheable data access request from the second node as a coherent data access request in the first node to access the coherent fabric of the first memory in the first node.

2. The system of claim 1, wherein the uncacheable data access request associated with the packet from the external source is a store or a write request to access the first memory.

3. The system of claim 1, wherein the uncacheable data access request by the second bridge follows a producer-consumer protocol.

4. The system of claim 3, wherein a payload and a flag are written to a memory location in the first node when following the producer-consumer protocol.

5. A method for managing coherent data access through multiple nodes, comprising:

establishing a cacheable coherent memory space in a first memory of a first data processing system that forms a first node, the first memory being local to the first node and to store first cacheable data having global coherency, wherein the first node supports packet traffic for transfer of packets, coherent traffic to access the first memory and non-coherent traffic to communicate with input/output (I/O) circuitry, and in which the first data processing system also includes a first processor, a first bridge and a first interface;

receiving at a second node a data packet from an external source to access a cache coherent fabric of the first memory in the first node, wherein the second node also supports packet traffic, coherent traffic and non-coherent traffic and is formed of a second data processing system that includes a second processor, a second bridge, a second interface and a second memory that is local to the second node, the second memory storing second cacheable data also having global coherency, the first and second interfaces coupling the first node to the second node via a bi-directional bus for transfer of packet traffic, coherent traffic and non-coherent traffic between the first and second nodes;

identifying in the second node that the first memory is located in the first node;

generating in the second bridge an uncacheable data access request to access the first memory in the first node for the data packet instead of performing a cache coherent memory access operation to access the first memory from the second node, so that the access to the first memory does not access a coherent fabric of the second memory in the second node;

transferring by the second bridge the uncacheable data access request to the first node;

receiving by the first bridge the uncacheable data access request from the second node through coupling between the first and second interfaces;

identifying the uncacheable data access request to the first memory as a local access in the first node;

processing the uncacheable data access request from the second node as a coherent data access to access the coherent fabric of the first memory in the first node; and accessing the coherent fabric of the first memory in the first node in response to receiving the packet from the external source, but without accessing the coherent fabric of the second memory in the second node.

6. The method of claim 5, wherein the uncacheable data access request associated with the packet from the external source is a store or a write request to access the first memory.

7. The method of claim 5, wherein the uncacheable data access request by the second bridge follows a producer-consumer protocol.

8. The method of claim 7, wherein a payload and a flag are written to a memory location in the first node when following the producer-consumer protocol.

* * * * *